United States Patent
Yamanouchi et al.

(10) Patent No.: US 6,680,805 B2
(45) Date of Patent: Jan. 20, 2004

(54) BINOCULAR AND OPTICAL AXIS ADJUSTING METHOD FOR BINOCULAR

(75) Inventors: Haruhiko Yamanouchi, Kanagawa (JP); Hironori Takano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,738

(22) Filed: Aug. 15, 2002

(65) Prior Publication Data

US 2003/0035230 A1 Feb. 20, 2003

(30) Foreign Application Priority Data

Aug. 20, 2001 (JP) ...................................... 2001-249394

(51) Int. Cl.[7] ................................................ G02B 7/02
(52) U.S. Cl. ......................... 359/817; 359/822; 396/53
(58) Field of Search .............................. 359/817, 822, 359/407–408, 411–415, 417, 418, 480–482, 554–557, 831–837, 399–400, 431, 678; 396/52–55; 348/208

(56) References Cited

U.S. PATENT DOCUMENTS 5,592,331 A * 1/1997 Eastcott ...................... 359/554
5,903,387 A   5/1999 Tomikawa et al. .......... 359/412
6,246,520 B1  6/2001 Iizuka ......................... 359/557
6,282,021 B1 * 8/2001 Yano ........................... 359/415

FOREIGN PATENT DOCUMENTS

| JP | 6-43365    | 2/1994  |
|----|------------|---------|
| JP | 6-250099   | 9/1994  |
| JP | 8-211303   | 8/1996  |
| JP | 9-281411   | 10/1997 |
| JP | 9-304704   | 11/1997 |
| JP | 10-213733  | 8/1998  |
| JP | 10-319325  | 12/1998 |
| JP | 2000-56351 | 2/2000  |

* cited by examiner

*Primary Examiner*—Hung Xuan Dang
*Assistant Examiner*—Joseph Martinez
(74) *Attorney, Agent, or Firm*—Morgan & Finnegan LLP (57) ABSTRACT

A binocular of this invention includes a pair of objective optical systems, a pair of eyepiece units for integrally holding erecting optical systems and eyepiece optical systems, and a holding member having a first holding portion for holding one of the pair of eyepiece units and a second holding portion for holding the other one of the pair of eyepiece units. The holding member is deformed such that the pair of eyepiece units has a predetermined positional relationship.

12 Claims, 9 Drawing Sheets

OBJECTIVE LENS SIDE
(FRONT)

BINOCULAR AND OPTICAL AXIS ADJUSTING METHOD FOR BINOCULAR

BACKGROUND OF THE INVENTION

1. Field of the Invention

The present invention relates to a binocular and, more particularly, to a binocular in which right and left optical axes are adjustable.

2. Related Background Art

A binocular has a pair of right and left objective optical systems, and a pair of right and left eyepiece units that integrally hold erecting optical systems comprised of erecting prisms and mirrors and eyepiece optical systems. In the binocular, all or some of the groups of the pair of right and left objective optical systems are held integrally, or are held such that they move together without changing a gap between them when the binocular is in use. A mechanism and method of adjusting the right and left optical axes of the binocular are available as follows.

(1) As is proposed in Japanese Patent Laid-Open No. 8-211303, in a binocular in which all groups of right and left objective lenses are integrally held by a fixing portion and an erecting optical system and eyepiece optical system serve together to form an eyepiece unit, an arrangement and method fix objective optical systems by moving and adjusting them in a direction perpendicular to an optical axis.

(2) As is proposed in Japanese Patent Laid-Open Nos. 10-319325 and 2000-56351, in a binocular in which all groups of right and left objective optical systems are integrally held by a movable portion and an erecting optical system and eyepiece optical system serve together to form an eyepiece unit, an arrangement and method fix one objective optical system while fixing the other objective optical system by moving and adjusting it in a direction perpendicular to an optical axis.

(3) As is proposed in Japanese Patent Laid-Open No. 10-213733, in a binocular in which right and left objective lenses are held such that the distance between them is not changed by eye-to-eye width adjustment but are rotatable and both the right and left objective lenses form telescopes, an arrangement and method rotate the respective telescope portions entirely about the optical axes of objective optical systems as the centers for eye-to-eye width adjustment, and adjust and move the directions of rotary axes for this rotation, thereby inclining the respective telescope portions entirely.

(4) As is proposed in Japanese Patent Laid-Open No. 9-281411 (U.S. Pat. No. 5,903,387), in a so-called "thin binocular" in which the distance between the objective optical systems changes during eye-to-eye width adjustment (when the binocular is in use) and an erecting optical system and eyepiece optical system are integrated, an arrangement and method adjust the objective optical system and eyepiece optical system by moving one of them vertically while moving the other horizontally to be independent of each other.

(5) As is proposed in Japanese Patent Laid-Open No. 9-304704, in a "thin binocular", an arrangement and method adjust right and left erecting optical system units by moving one of them vertically whole moving the other horizontally to be independent of each other.

(6) As an optical axis adjusting mechanism and method that have been used since a long time ago in a "mid-foldable binocular" or the like, an arrangement and method set the outer shape of the lens frame of an objective lens to be eccentric from the optical axis of the lens, fix and arrange a spacer having an eccentric amount almost equal to that of the lens frame around the mirror frame, adjust and set the eccentric amount of the mirror frame from the optical axis with a rotary phase with respect to the spacer, and adjust and set the optical axis of the spacer in the eccentric direction with a rotary phase with respect to a fixing portion (accepting portion).

In these conventional optical axis adjusting mechanisms and methods, the relationship in parallel degree between the optical axis of the objective optical system and that of the eyepiece optical system can be maintained the same before and after adjustment.

Of these conventional optical axis adjusting mechanisms and methods for the binocular as described above, in (1) and (2), to fix the objective optical systems during or after adjustment, the fixing operation must be performed in the vicinity of the optical axis. Hence, the fixing adjustment and adjustment checking should not be performed across the optical path. This makes the operation difficult to perform.

In (2), the objective optical systems themselves, which are to be adjusted, are fixed to an objective base that moves during focal point adjustment, or are fixed to an objective lens holder which is part of an image shaking correction mechanism. To perform adjustment or fixing after adjustment, unless the objective lens fixing portions are securely fixed by using a tool or the like, adjustment or fixing cannot be performed. This is cumbersome.

In (3), the first lens barrel in the vicinity of the objective optical system is rotated during use (eye-to-eye width adjustment). Therefore, it is difficult to arrange a mechanism for imparting an additional function such as image shaking correction or automatic focus adjustment to the front half of the binocular.

In both the so-called "thin binocular" of (4) and (5) and the so-called "mid-foldable binocular" of (6), the right and left objective optical systems are not integrated, and undesirably move horizontally during eye-to-eye width adjustment. Such binocular may serve all right as a conventional binocular. When, however, a mechanism for an additional function is to be particularly added, large limitations are imposed in terms of space and function.

SUMMARY OF THE INVENTION

It is, therefore, an object of the present invention to provide a binocular in which right and left optical axes can be adjusted easily without causing any problem when providing an additional function for enlarging the observation performance of the binocular or the application range of the binocular in addition to the main function of a conventional binocular.

In order to achieve the above object, a binocular according to the present invention comprises:

a pair of objective optical systems;

a pair of eyepiece units for integrally holding erecting optical systems and eyepiece optical systems; and a holding member having a first holding portion for holding one of the pair of eyepiece units and a second holding portion for holding the other one of the pair of eyepiece units, wherein the holding member is deformed such that the pair of eyepiece units have a predetermined positional relationship.

A binocular according to the present invention comprises:
a pair of objective optical systems;
a pair of eyepiece units for integrally holding erecting optical systems and eyepiece optical systems; and
a holding member having a first holding portion for holding one of the pair of eyepiece units and a second holding portion for holding the other one of the pair of eyepiece units,
wherein the holding member can be deformed such that the pair of eyepiece units have a predetermined positional relationship.

A method of manufacturing a binocular according to the present invention comprises the steps of:
holding one of a pair of optical units with a first holding portion of a holding member, and holding the other one of the pair of optical units with a second holding portion of the holding member; and
deforming the holding member, thereby adjusting a positional relationship between the optical units.

Furthermore, a method of manufacturing a binocular comprises the steps of:
holding one of a pair of optical units with a first holding portion of a holding member, and holding the other one of the pair of optical units with a second holding portion of the holding member;
connecting a bent portion of the first holding portion and a bent portion of the second holding portion through a connecting member;
setting a connecting position of the connecting member and the bent portion of the first holding portion to be eccentric by rotating an eccentric roller, so the holding member is deformed, thereby adjusting a positional relationship between the optical units.

The practical applications of the present invention will become apparent in the detailed description of the invention which follows.

DESCRIPTION OF THE PREFERRED EMBODIMENTS

The preferred embodiments of the present invention will be described. The first embodiment is an embodiment of a shaking-proof binocular on which a so-called variangle prism mechanism for image shaking correction is mounted. In this binocular, a pair of right and left objective optical systems are held integrally.

(First Embodiment)

Figure 1:
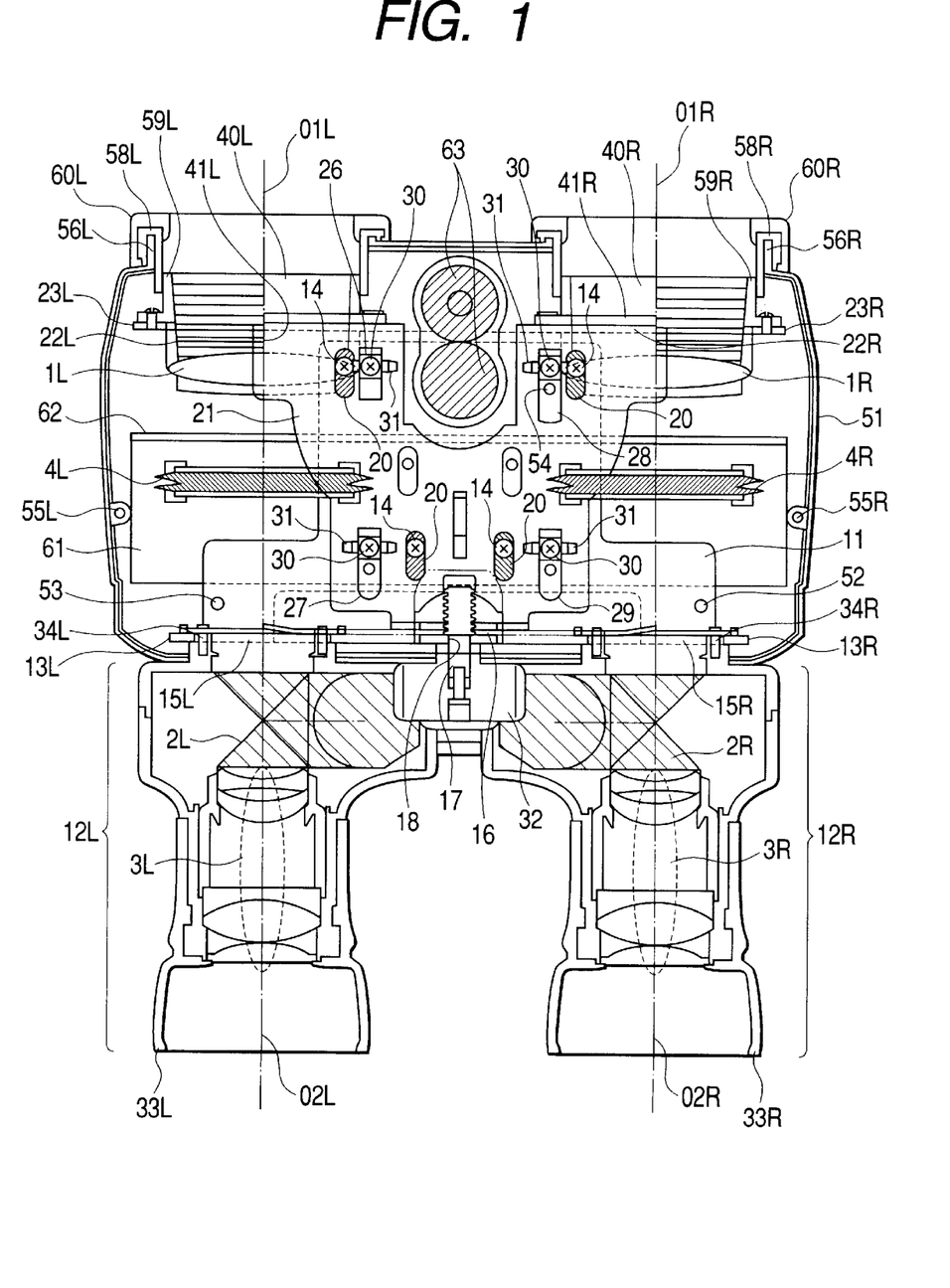
FIG. 1 is a plan sectional view of a binocular of the first embodiment.
Figure 2:
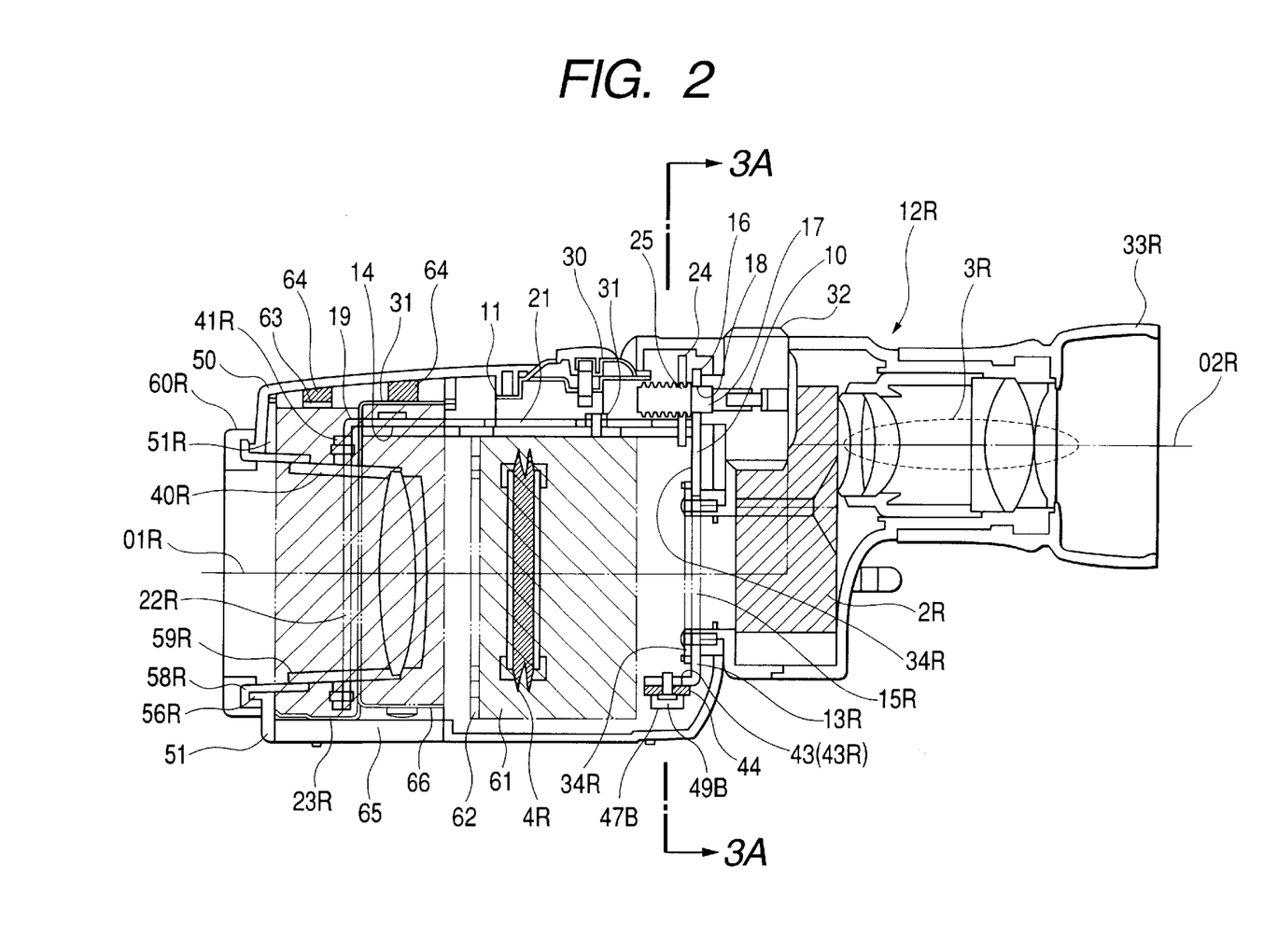
FIG. 2 is a sectional view of the side surface of the binocular of the first embodiment.
Figure 3A:
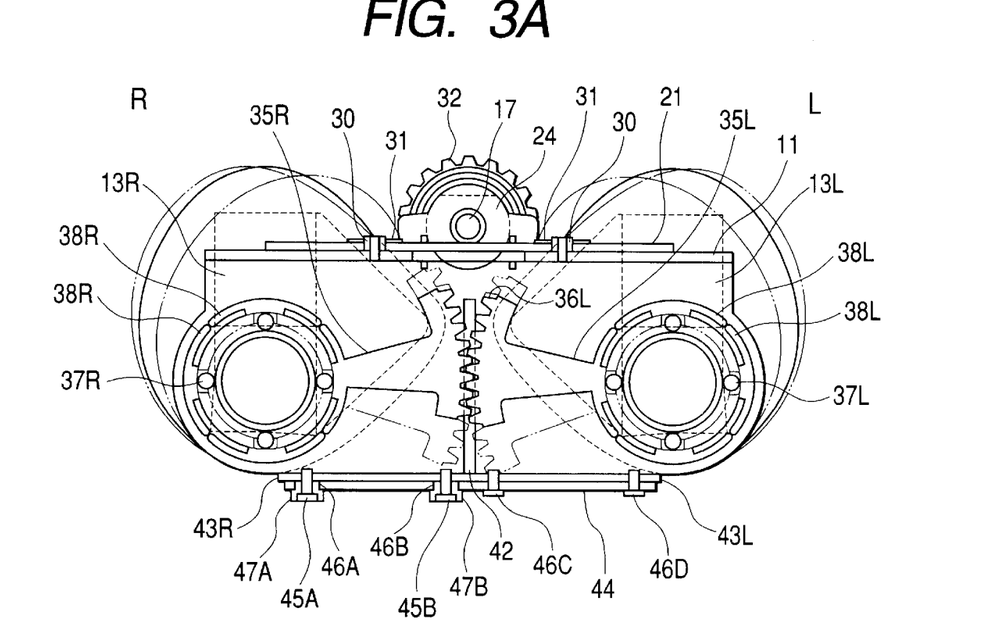
FIG. 3A is a front sectional view taken along the line 3A—3A of FIG. 2.
Figure 3B:
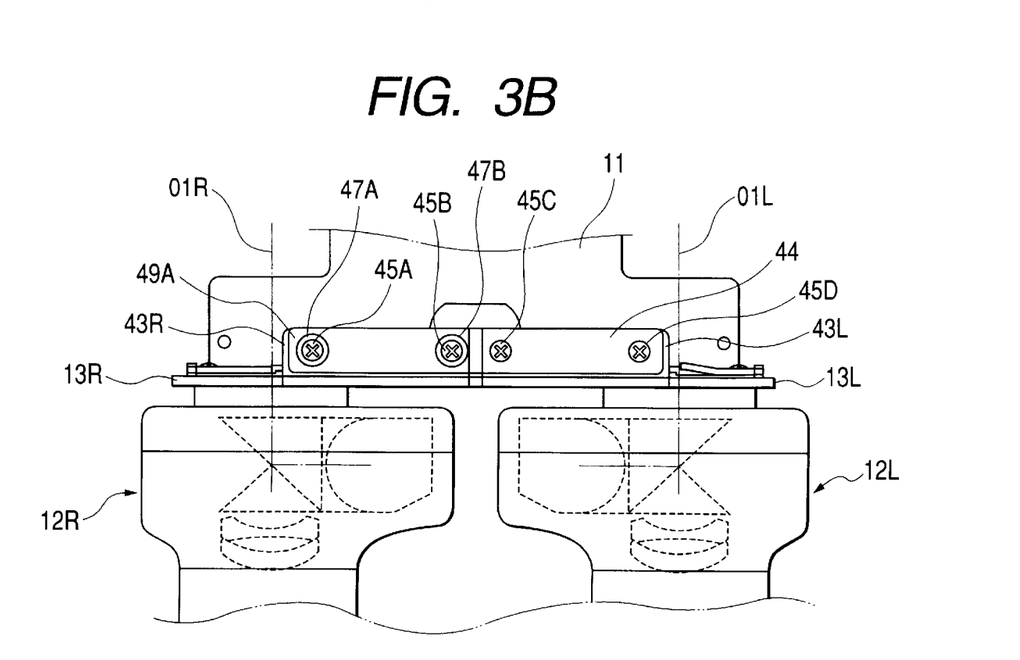
FIG. 3B is a bottom view of FIG. 3A.
Figure 4:
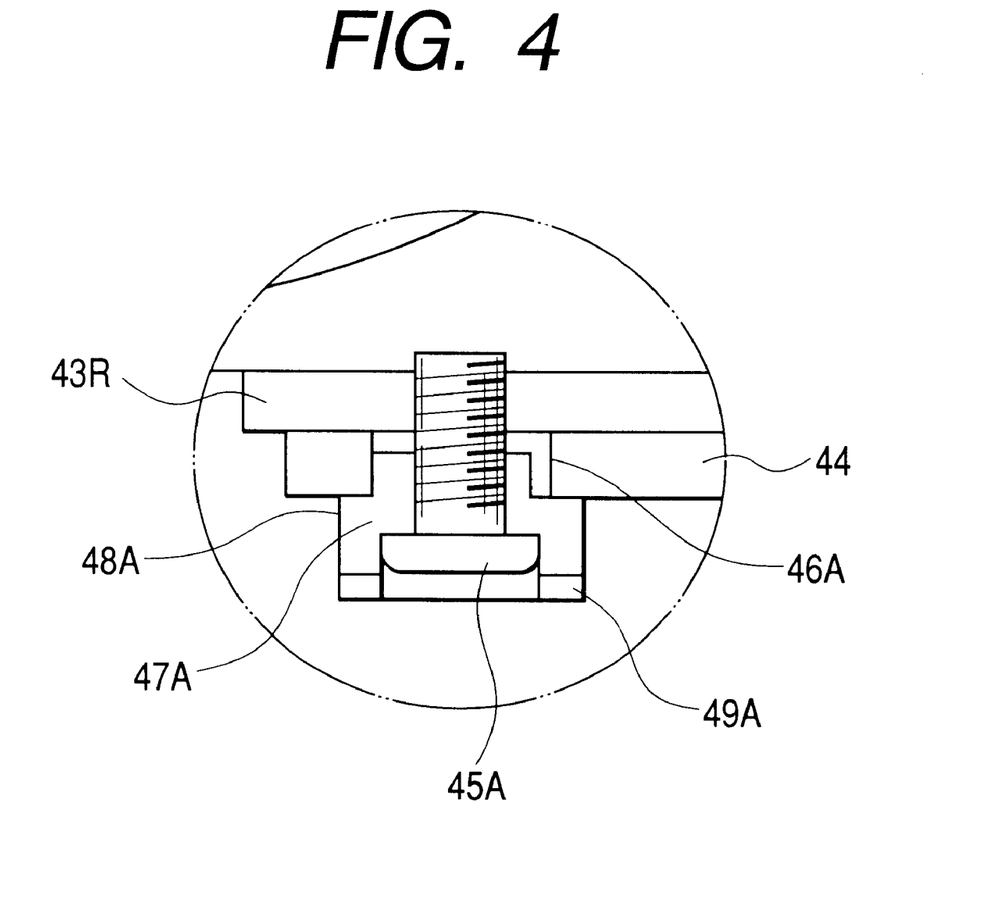
FIG. 4 is an enlarged view of the main part of an adjusting mechanism in the binocular of the first embodiment.
Figure 5A:
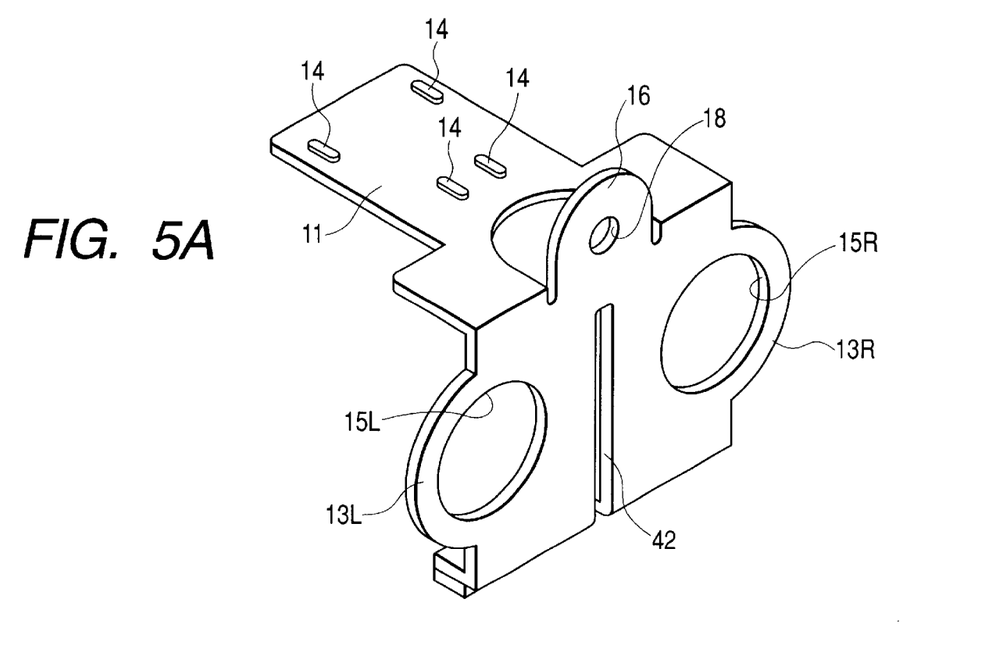
FIG. 5A is a perspective view of the base and adjusting mechanism of the binocular of the first embodiment.
Figure 5B:
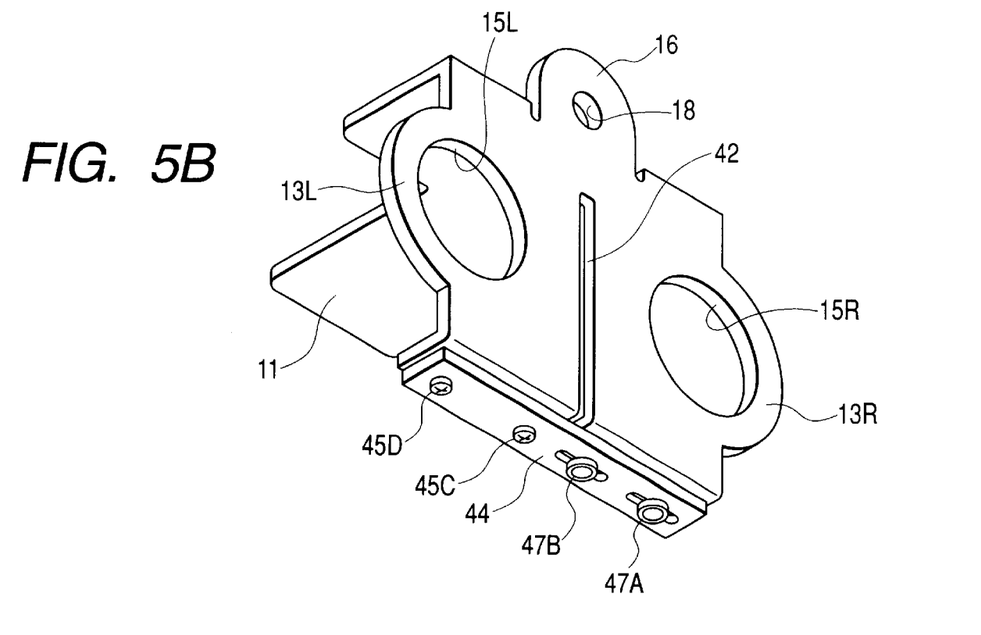
FIG. 5B is a perspective view of the base and adjusting mechanism of the binocular of the first embodiment.
Figure 6A:
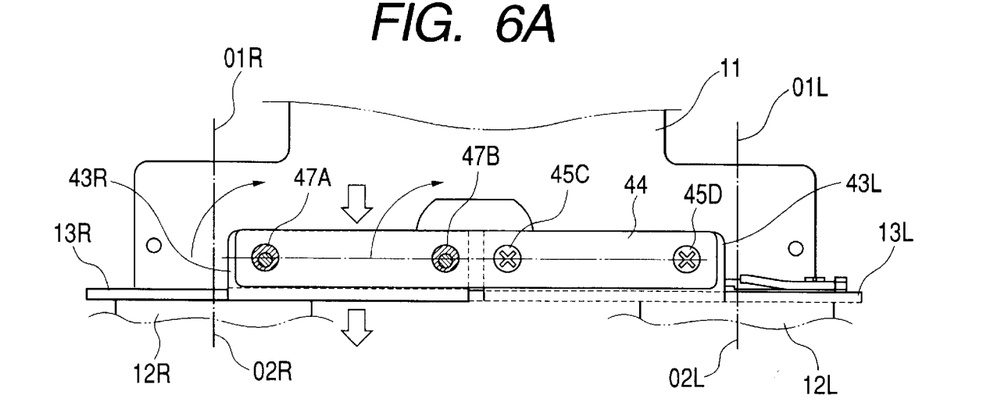
FIGS. 6A, 6B, and 6C are views for explaining the adjusting mechanism of the binocular of the first embodiment.
Figure 6B:
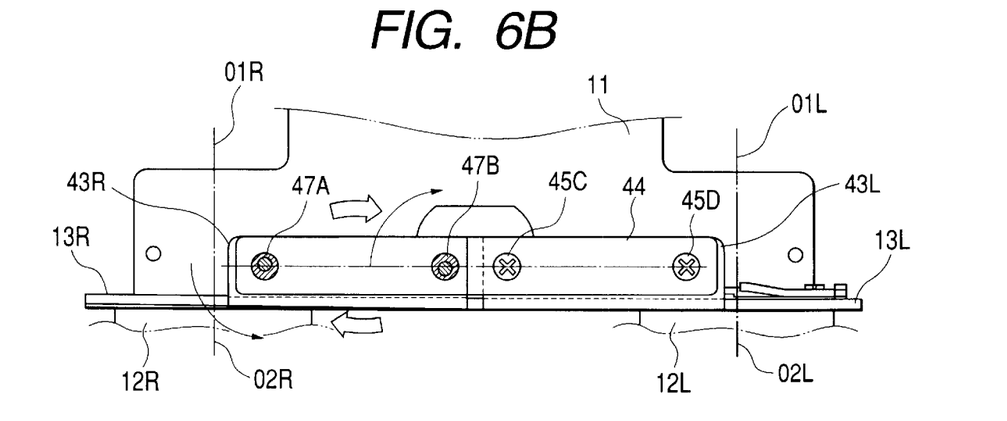
Figure 6C:
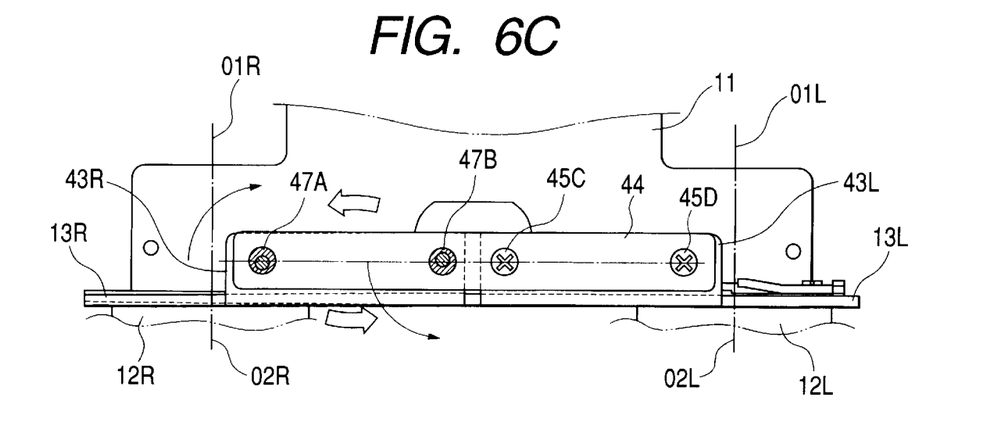

FIG. 1 is a sectional view seen from above of a binocular according to the first embodiment of the present invention. FIG. 2 is a longitudinal sectional view of the binocular seen from the side surface. FIG. 3A is a sectional view taken along the line 3A—3A of FIG. 2. FIG. 3B is a view of an eccentricity adjusting mechanism seen from below. FIG. 4 is an enlarged view of the main part of the section 3A—3A of FIG. 2. FIGS. 5A and 5B are perspective views showing a base and eccentricity adjusting mechanism. FIGS. 6A, 6B, and 6C are views for explaining the eccentricity adjusting mechanism. The first embodiment will be described with reference to FIGS. 1 to 4 and FIGS. 5A through 5B, and FIGS. 6A through 6C.

A binocular optical system is comprised of a pair of left and right objective lenses 1L and 1R, a pair of left and right polo II erecting prisms 2L and 2R, a pair of left and right eyepieces 3L and 3R, and liquid-sealed variangle prisms 4L and 4R.

The objective lenses 1L and 1R have a pair of parallel left and right optical axes O1L and O1R. The optical axes O1L and O1R respectively pass through the centers of the variangle prisms 4L and 4R to reach the incident surfaces of the pair of left and right erecting prisms 2L and 2R.

Optical axes O2L and O2R of the pair of left and right eyepieces 3L and 3R, which are parallel to but not coaxial with the optical axes O1L and O1R of the objective lenses 1L and 1R, continue to the respective exit surfaces of the pair of left and right erecting prisms 2L and 2R.

A base (holding member) 10 for the binocular is made of a metal plate. As shown in FIGS. 5A and 5B as well, the base 10 is formed of a horizontal portion 11 parallel to a plane including the left and right optical axes O1L and O1R, and holding portions 13L and 13R which are bent at right angles to depend from the rear end of the horizontal portion 11 to hold eyepiece units 12L and 12R. Four embosses 14 for sliding movement project from the horizontal portion 11. Slide holes 15L and 15R are formed on the holding portions 13L and 13R about the optical axes O1L and O1R as the centers.

An upward projecting projection 16 is formed at the center in the left-to-right direction of the rear end of the base 10. The projection 16 has a rotation holding hole 18 for rotatably holding a focusing screw 17 at a fixed position.

An objective base 19 is made of a metal plate. The objective base 19 is formed of a horizontal portion 21 including four sliding portions 20 which slide to correspond to the four embosses 14 of the base 10, and holding portions 23L and 23R which are bent at right angles to depend from the front end of the horizontal portion 21 and have holes 22L and 22R about the optical axes O1L and O1R as the centers.

An upward projecting projection 24 is formed at the center in the left-to-right direction of the rear end of the horizontal portion 21. The projection 24 has a female screw 25 which threadably engages with the focusing screw 17 to correspond to the rotation holding hole 18 formed in the projection 16 of the base 10.

The horizontal portion 21 of the objective base 19 has guide holes 26 and 27 in the directions of the optical axes O1L and O1R, and guide relief holes 28 and 29 with widths slightly larger than those of the guide holes 26 and 27. Four guide members 30 with the same shape and four guide springs 31 are fixed to the horizontal portion 11 of the base 10 with machine screws. The guide members 30 have such sizes that they fit in the guide holes 26 and 27 but slightly deviate from the guide relief holes 28 and 29. The guide springs 31 act on the peripheries of the guide holes 26 and 27 and guide relief holes 28 and 29 so as to urge the horizontal portion 21 of the objective base 19 against the horizontal portion 11 of the base 10.

The objective base 19 is guided by the two guide members 30 fitting in the guide holes 26 and 27 to be movable in the direction of optical axis with reference to the base 10. The sliding portions 20 are held by the biasing forces of the four guide springs 31 to be in tight contact.

The focusing screw 17 is rotatably held by the rotation holding hole 18 formed in the projection 16 of the base 10. A focus knob 32 is fixed to the rear end of the focusing screw 17 with a machine screw, to prevent the focusing screw 17 from coming out in the direction of optical axis. The focusing screw 17 rotates at a fixed position with respect to the base 10, and its threaded portion threadably engages with the female screw 25 of the projection 24 of the objective base 19. Hence, when the focus knob 32 is rotated, the focusing screw 17 can be moved in the direction of optical axis with the objective base 19 entirely being urged against the base 10.

The pair of left and right eyepiece units 12L and 12R are symmetrical, and hold in them the eyepieces 3L and 3R and the polo II erecting prisms 2L and 2R, which have incident surfaces corresponding to the optical axes 01L and 01R and exit surfaces corresponding to the optical axes 02L and 02R of the eyepieces 3L and 3R. A pair of rubber eye pads 33L and 33R are attached to the rear ends of the eyepiece units 12L and 12R.

Flanges 34L and 34R are formed on the front end faces of the eyepiece units 12L and 12R to slightly project from the holding portions 13L and 13R which are bent at right angles with respect to the horizontal portion 11 of the base 10. The flanges 34L and 34R engage with the slide holes 15L and 15R which have the optical axes 01L and 01R as their centers.

A pair of right and left interlocking plates 35L and 35R which are substantially symmetrical as shown in FIG. 3A are attached to the eyepiece units 12L and 12R. The interlocking plates 35L and 35R mesh with each other through gears 36L and 35R on their inner sides.

The interlocking plates 35L and 35R are fixed to the flanges 34L and 34R at the front end faces of the pair of left and right eyepiece units 12L and 12R with four machine screws 37L and 37R. Outer portions 38L and 38R of the machine screw-fixed portions extend in the circumferential direction, and are appropriately bent toward the optical axes 01L and 01R. Thus, when the interlocking plates 35L and 35R are fixed with the machine screws, they charge the holding portions 13L and 13R of the base 10.

A pair of left and right objective lens barrels 40L and 40R respectively hold the pair of left and right objective lenses 1L and 1R near their rear ends, are bent at flanges 41L and 41R at right angles with respect to the optical axis 01L of the objective base 19, and are fixed to the holding portions 23L and 23R, respectively having the holes 22L and 22R with the optical axes 01L and 01R as the centers, with machine screws.

The pair of left and right objective lenses and the pair of left and right eyepiece units for integrally holding the erecting prisms and eyepieces, which form the basic portion of the binocular, and the positional relationship between them have been described so far. Description will now be made on the arrangement of a portion with which optical axis adjustment is performed by moving one of the pair of left and right eyepiece units 12L and 12R in an inclined manner with respect to the other.

Although prisms are used as the erecting optical systems in this embodiment, mirrors may be used instead.

As described above, an groove 42 is formed between the holding portions 13L and 13R, perpendicular to the optical axis, of the base 10 made of the metal plate, to run upward from the lower end of the center of the base 10, as shown in FIG. 3A. The right eyepiece unit 12R is held by the holding portion 13L (first holding portion), and the left eyepiece unit 12L is held by the holding portion (second holding portion) 13R. Note that the right side of FIG. 3A corresponds to a left side L of the binocular, and that the left side of FIG. 3A corresponds to a right side R of the binocular.

Bent portions 43L and 43R that are bent forward are formed at the lower ends of the holding portions 13L and 13R, respectively.

An adjusting plate (connecting member) 44 is in contact with both the bent portions 43L and 43R, as shown in FIGS. 3B, 5A, and 5B, and has a size substantially equal to that of the bent portions 43L and 43R altogether. Holes 46C and 46D to be engageable with fixing machine screws 45C and 45D are formed in the left portion of the adjusting plate 44 at positions corresponding to the machine screw holes formed in the bent portion 43L. The left portion of the adjusting plate 44 is fixed to the bent portion 43L with a machine screw.

Elliptic holes 46A and 46B of the same shape, which are engageable with the eccentric roller portions of eccentric rollers 47A and 47B for optical axis adjustment and slightly elongated in the horizontal direction, are formed in the right portion of the adjusting plate 44, at positions corresponding to the machine screw holes formed in the bent portion 43R.

As shown in FIG. 4, the eccentric rollers 47A and 47B for optical axis adjustment have eccentric roller portions with lengths slightly smaller than the thickness of the adjusting plate 44, and slightly large outer-diameter portions 48A and 48B. Hence, when machine screws 45A and 45B are fastened, their chins get caught by the adjusting plate 44, so the adjusting plate 44 can be fixed to the bent portion 43R.

The eccentric rollers 47A and 47B have slots 49A and 49B in their outer-diameter portions. Hence, the eccentric rollers 47A and 47B can be rotatably adjusted easily with a flat-tip screwdriver or the like by slightly loosening the machine screws 45A and 45B.

In the optical axis eccentricity adjusting mechanism with the above arrangement, first, the fixing machine screws 45C and 45D are fastened so the left portion of the adjusting plate 44 is fixed to (integrated with) the bent portion 43L. When the eccentric rollers 47A and 48B are rotated, the bent portion 43R can be moved slightly forward or backward in this vicinity in the direction of optical axis with respect to the adjusting plate 44 (or with respect to the adjusting plate 44 as an extension of the bent portion 43L on the integrated left portion). This is because the holding portions 13L and 13R are made of metal plates and thus can be flexed (deformed) slightly by the arrangement described above.

Regarding the holding portions 13L and 13R of the base (holding member) 10, for example, when the eccentric rollers 47A and 47B are rotated in the same direction (clockwise in FIG. 6A) to finely move the bent portion 43R backward relative to the adjusting plate 44, the holding portion 13R flexes (deforms) backward and is simultaneously inclined upward because of the groove 42 formed between the holding portions 13L and 13R. Hence, the eyepiece unit 12R held by the holding portion 13R is inclined in such a direction that the eyecup 33R goes up with respect to the optical axis of the objective lens 1R. Consequently, the optical axis of the eyepiece unit 12R is inclined upward with respect to the optical axis of the eyepiece unit 12L.

That the adjusting plate 44 receives a force forward of the bent portion 43R is almost equal to receiving a force forward of the bent portion 43R in the natural state. The left bent portion 43L which fixes and holds the adjusting plate 44 also flexes (deforms) forward, and the holding portion 13L also flexes (deforms) forward. The eyepiece unit 12L held by the holding portion 13L is inclined in such a direction that the eyecup 33L goes down.

When the eccentric rollers 47A and 47B are rotated in the same direction (clockwise in FIG. 6A) to finely move the bent portion 43R backward relative to the adjusting plate 44, the eyepiece unit 12R is inclined with respect to the eyepiece unit 12L in such a direction that the eyecup 33R goes up. When the eccentric rollers 47A and 47B are rotated counterclockwise in FIG. 6A to finely move the bent portion 43R forward relative to the adjusting plate 44, the eyepiece unit 12R is inclined with respect to the eyepiece unit 12L in such a direction that the eyecup 33R goes down.

A movement that takes place when the eccentric rollers 47A and 47B are moved in opposite directions when seen from the adjusting plate 44 can also be explained as an extension of the above movement. The eyepiece unit 12R behaves as if it shook its head almost with respect to a horizontal plane, so it moves almost in the left-to-right direction with respect to the eyepiece unit 12L.

As shown in FIG. 6B, when the eccentric rollers 47A and 47B are rotated counterclockwise and clockwise, respectively, so the bent portion 43R finely rotatably moves clockwise with respect to the adjusting plate 44, the holding portion 13R flexes (deforms) clockwise. Thus, the optical axis of the eyepiece unit 12R held by the holding portion 13R is inclined clockwise shown in FIG. 6B on the horizontal plane with respect to the optical axis of the eyepiece unit 12L.

As shown in FIG. 6C, when the eccentric rollers 47A and 47B are rotated clockwise and counterclockwise, respectively, so the bent portion 43R finely rotatably moves counterclockwise with respect to the adjusting plate 44, the holding portion 13R flexes (deforms) counterclockwise. Thus, the optical axis of the eyepiece unit 12R held by the holding portion 13R is inclined counterclockwise shown in FIG. 6C on the horizontal plane with respect to the optical axis of the eyepiece unit 12L.

Regarding the relationship between the eccentric rollers and alignment of the right and left optical axes of the binocular, (1) when the eccentric rollers 47A and 47B are rotated to move in the same direction, as shown in FIG. 6A, the base 10 deforms, so optical axis alignment in the up-to-down direction can be realized. (2) When the eccentric rollers 47A and 47B are rotated to move in different directions, as shown in FIGS. 6B and 6C, the base 10 deforms, so optical axis alignment in the left-to-right direction can be realized.

An upper cover 50 and lower cover 51 shown in FIG. 2 are formed such that they almost entirely engage with each other vertically in a plane including the optical axes 01L and 01R. The upper cover 50 covers the base 10, focusing screw 17, objective base 19, left and right objective lens barrels 40L and 40R, and the like, and fixes the base 10 to the three positioning portions (not shown) with machine screws from the ceiling of the inner surface through attaching holes 52, 53, and 54 shown in FIG. 1.

The lower cover 51 engages with the upper cover 50 throughout its entire periphery except for around the objective lens barrels 40L and 40R, around the eyepiece units 12L and 12R, and around the focusing screw 17, and is fixed to the upper cover 50 with machine screws through two attaching holes 55L and 55R (shown in FIG. 1).

Cylindrically extending distal ends 56L and 56R of the lower cover 51 and the cylindrically extending distal ends (not shown) of the upper cover 50 engage with each other to form cylindrical portions. These cylindrical portions are fitted in ring-like objective covers 58L and 58R each with a lateral U-shaped section, and are fixed to them by adhesion or the like.

Furthermore, dustproof sheets 59L and 59R are fitted to engage with outer surface grooves in the outer surfaces of the distal ends of the objective lens barrels 40L and 40R, and the outer diameters of the dustproof sheets 59L and 59R and the inner diameters of the objective covers 58L and 58R fit with each other. Objective rubber members 60L and 60R are attached to the distal ends of the objective covers 58L and 58R to cover them.

A shaking-proof unit 61 incorporating the variangle prisms 4L and 4R is arranged deep inside the objective lenses 1L and 1R. The shaking-proof unit 61 is attached with an electrical circuit board 62 belonging to it. Two batteries 63 are put between the objective lens barrels 40L and 40R, and two electrodes 64 having spring properties are arranged on the inner surface of the upper cover 50 to correspond to the batteries 63. The electrodes 64 are connected to the electrical circuit board 62 through lead wires (not shown).

The batteries 63 are held in the binocular while being sandwiched by the two electrodes 64 and a common electrode 66 fixed to a lid 65 attached to the lower cover 51, so they operate in a housed state.

With the above arrangement, the pair of left and right eyepiece units 12L and 12R rotatably move in opposite directions while they are in tight contact with the holding portions 13L and 13R which are bent at right angles with respect to the horizontal portion 11 of the base 10, so they can change the distance between the optical axes 02L and 02R of the eyepieces 3L and 3R.

Regarding adjustment of the right and left optical axes, adjustment in the up-to-down direction and left-to-right direction (cross-eye and wall-eye direction) can be realized by rotations of the two rollers, i.e., the eccentric rollers 47A and 47B, as described above. This adjustment can be performed from the lower surface without going across the optical axes at all, as is apparent from FIG. 2.

When necessary, adjustment can be performed with the lower cover 51 being attached, through a tool hole formed at a predetermined position of the lower cover 51.

Regarding the shaking-proof unit 61, a unit as proposed in, e.g., Japanese Patent Laid-Open No. 6-43365 (U.S. Pat. No. 6,246,520), can be used, which incorporates a shaking sensor for detecting the shaking amount of an optical device, and a drive control circuit for driving a variable apex angle prism that seals a liquid in it so as to suppress shaking of an object image formed by the objective lenses 1L and 1R on the basis of an output signal from the shaking sensor.

Alternatively, a unit as proposed in Japanese Patent Laid-Open No. 6-250099 can also be used, which incorporates a correction optical system in which two deviation angle prisms for transmitting therethrough and deflecting light beams of objective lenses are arrayed in the direction of thickness, a deviation angle prism rotary drive circuit for rotating the two deviation angle prisms through the same angle in opposite directions about their common axis as the center, a shaking sensor, a drive control circuit, and the like.

(Second Embodiment)

Figure 7:
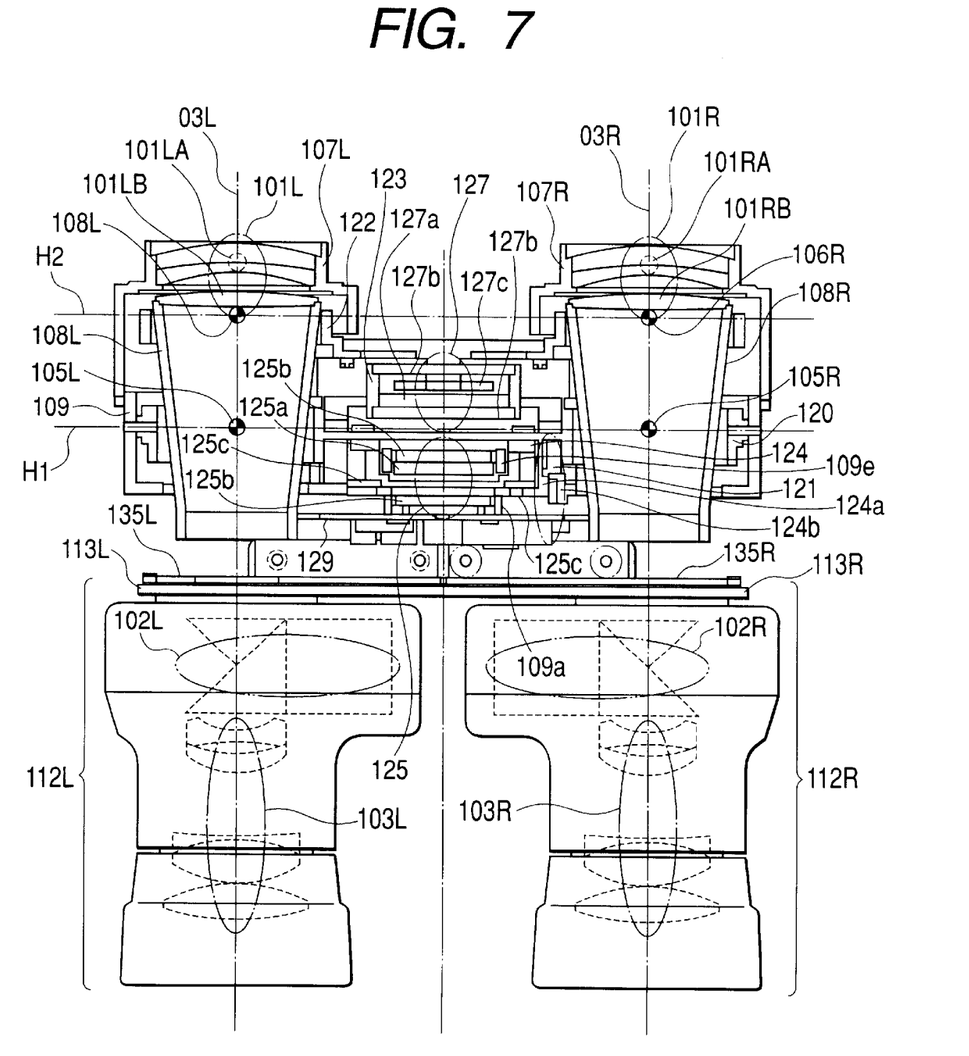
FIG. 7 is a plan sectional view of a binocular of the second embodiment.
Figure 8:
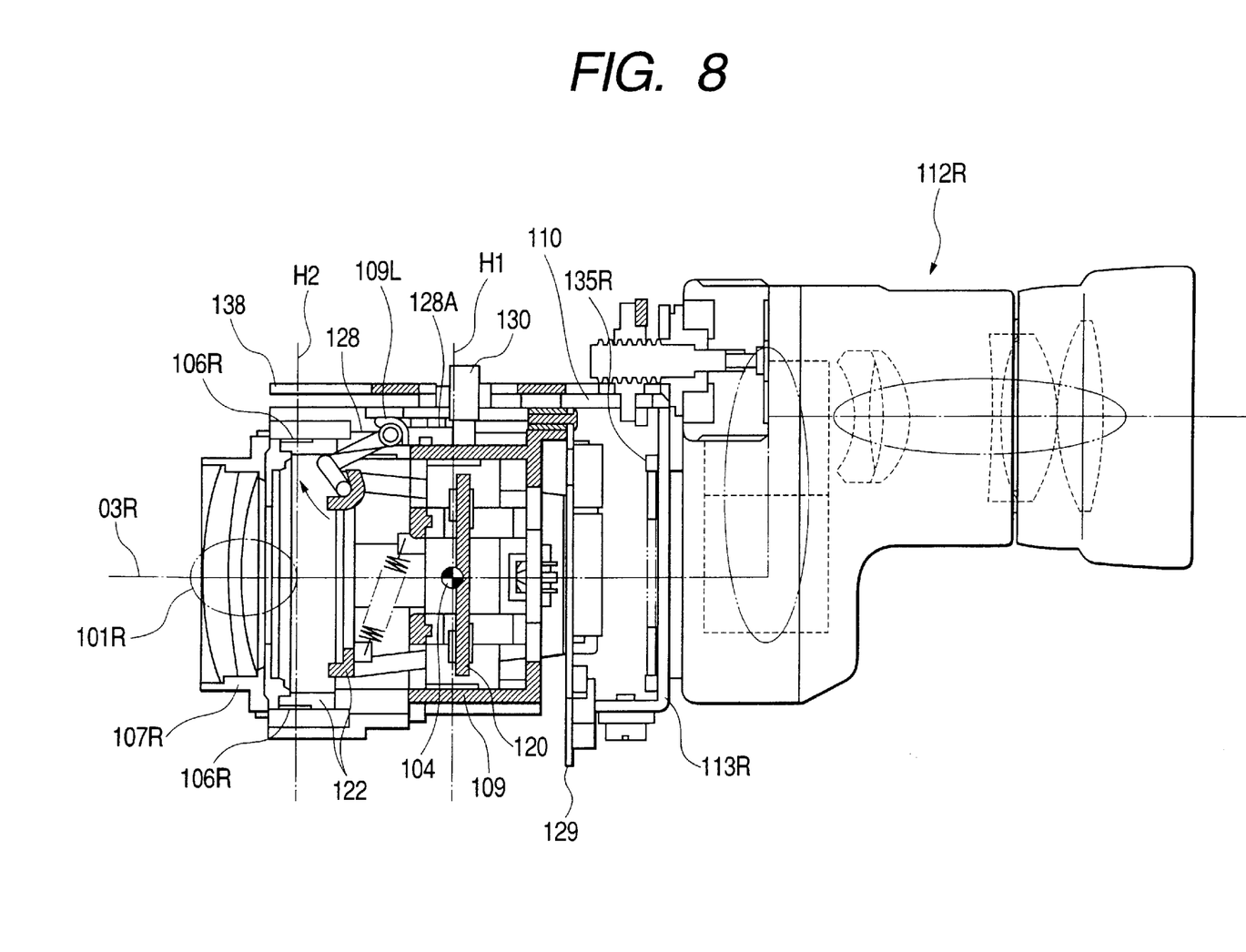
FIG. 8 is a sectional view of the side surface of the binocular of the second embodiment.

FIGS. 7 and 8 show the arrangement of a binocular according to the second embodiment of the present invention. In this binocular, a pair of right and left objective lenses are each comprised of two groups. A shaking-proof unit is mounted in the binocular. The shaking-proof unit shift-drives the respective rear groups in a direction perpendicular to the optical axis by interlocking them for the purpose of hand shaking correction, while the respective rear groups have corresponding rotary axes. In the binocular of this embodiment, the front group of the right objective lens and that of the left objective lens are held integrally.

In this embodiment, eyepiece units held by a base (holding member) 110, how the eyepiece units are held and the eye-to-eye width of the eyepiece units, the arrangement and function of an adjusting mechanism portion, a focal point adjusting mechanism portion, and the like are similar to those of the first embodiment, and a detailed description thereof will accordingly be omitted.

FIG. 7 shows a section obtained by cutting the binocular of this embodiment at a plane including right and left optical axes, and FIG. 8 shows a vertical section obtained by cutting this binocular at a central plane. In this embodiment, a casing member that covers a binocular main body is not shown.

The schematic arrangement of the optical system of this binocular will be described. The optical system of the binocular is comprised of a pair of left and objective lenses 101L and 101R, a pair of left and right polo II erecting prisms 102L and 102R, and a pair of left and right eyepieces 103L and 103R. The objective lens 101L, erecting prism 102L, and eyepiece 103L form a left telescopic optical system, and the objective lens 101R, erecting prism 102R, and eyepiece 103R form a right telescopic optical system.

The optical systems of the erecting prisms 102L and 102R and eyepieces 103L and 103R are integrally held to form eyepiece units 112R and 112L. Rubber eye pads, interlocking plates 135L and 135R, and the like are integrally attached to the eyepiece units 112L and 112R. The eyepiece units 112R and 112L are held by holding portions 113R and 113L of the base 110 to be rotatable together for the purpose of eye-to-eye width adjustment, in the same manner as in the first embodiment.

The objective lenses 101L and 101R have optical axes 03L and 03R parallel to each other. Light beams that have become incident on the objective lenses 101L and 101R then hit the eyepiece units 112R and 112L, respectively, so an enlarged image can be seen with both eyes.

The objective lenses 101L and 101R are respectively formed of front and rear groups 101LA and 101LB, and front and rear groups 101RA and 101RB. Image shaking correction during observation is performed by pivoting the rear groups (shaking correction lenses) 101LB and 101RB in the yawing direction and pitching direction of binocular observation.

The arrangement of the objective lens portion will be described in more detail. Reference numeral 104 shown in FIG. 8 denotes a pitching pivot fulcrum perpendicular to the optical axes 03L and 03R and extending in the yawing direction. The pitching pivot fulcrum 104 is present within the first plane (H1 of FIG. 7) perpendicular to the optical axes 03L and 03R.

Reference numerals 105L and 105R shown in FIG. 7 denote left and right yawing pivot fulcrums perpendicular to the optical axes 03L and 03R and extending in the pitching direction. The yawing pivot fulcrums 105L and 105R are present within the first plane H1 described above. Namely, both the pitching pivot fulcrum 104 and the yawing pivot fulcrums 105L and 105R are present within the first plane H1.

Reference numerals 106L and 106R shown in FIG. 7 denote left and right connecting pivot fulcrums extending parallel to the yawing pivot fulcrums 105L and 105R. The connecting pivot fulcrums 106L and 106R are present within a second plane H2 parallel to the first plane H1, which is perpendicular to the optical axes 03L and 03R and away from the first plane H1 toward the optical axes 03L and 03R.

Reference numerals 107L and 107R denote a pair of left and right objective fixing cylinders for respectively fixing the front groups 101LA and 101RA of the objective lenses 101L and 101R. The objective fixing cylinders 107L and 107R are fixed to an IS main body 109 (to be described later) with machine screws or the like so the optical axes 03L and 03R are parallel to each other and have a predetermined distance between them.

Reference numerals 108L and 108R denote a pair of left and right yawing holding frames for respectively holding the rear groups 101LB and 101RB of the objective lenses 101L and 101R (in this embodiment, they hold the rear lens groups 101LB and 1011RB by caulking). The yawing pivot fulcrums 105L and 105R are integrally attached to the yawing holding frames 108L and 108R.

A permanent magnet (not shown) for constituting a yawing direction detector (not shown) is fixed to that rear side of the yawing pivot fulcrum 105L, which is on the upper portion of the yawing holding frame 108L, with an adhesive or the like.

The connecting pivot fulcrums 106L and 106R are integrally and vertically attached to the front sides of the yawing holding frames 108L and 108R.

Reference numeral 109 denotes an IS main body having a fitting hole in which the pitching pivot fulcrum 104 is to be fitted and held pivotally. The IS main body 109 widely opens to the objective lenses 101L and 101R, and has holes on sides close to the eyepiece units 112L and 112R where the rear portions of the yawing holding frames 108L and 108R pass. Furthermore, four attaching seats 109a for attaching a drive control board 129 are formed on the rear end face of the IS main body 109.

A support 109e for supporting a permanent magnet 125a and yoke 125b, which constitute a pitching-direction driving mechanism 125, is formed at the center of the IS main body 109. A Hall element 124b which constitutes a pitching-direction detector 124 is fixed to the right side of the center of the IS main body 109 with an adhesive or the like.

Two positioning pins (not shown) for fixing the IS main body 109 to a focus interlocking plate 138, and four attaching seats (not shown) for attaching the focus interlocking plate 138 are formed at the center of the upper portion of the IS main body 109. A support 109L for supporting an IS locking member 128 is formed at the front side of the upper portion of the IS main body 109.

Reference numeral 120 denotes a pitch holding frame, to which the pitching pivot fulcrum 104 is integrally attached. As described above, the pitching pivot fulcrum 104 is held by the IS main body 109 to be rotatable in the pitching direction through a predetermined angle. Thus, the pitch holding frame 120 can rotate in the pitching direction with respect to the IS main body 109 through a predetermined angle.

The pitch holding frame 120 has right and left holes, in the same manner as the IS main body 109, where the yawing holding frames 108L and 108R are to extend until almost their central portions. The pitch holding frame 120 holds the yawing pivot fulcrums 105L and 105R to be pivotal in the yawing direction through predetermined angles. Hence, the yawing holding frames 108L and 108R for holding the rear groups 101LB and 101RB are pivotal with respect to the pitch holding frame 120 and IS main body 109 in the yawing direction through predetermined angles.

A permanent magnet 124a for constituting the pitching-direction detector 124 is fixed to the center of the pitch holding frame 120 with an adhesive or the like.

A coil support member 121 is also attached to the pitch holding frame 120. A coil 125c for constituting the pitching-direction driving mechanism 125 is fixed to the coil support member 121.

Reference numeral 122 denotes a yaw bridge. The yaw bridge 122 holds the yawing holding frames 108L and 108R such that the optical axes of the rear groups 101LB and 101RB, pivotally attached to the connecting pivot fulcrums 106L and 106R and held by the yawing holding frames 108L and 108R, coincide with the optical axes of the front groups 101LA and 101RA.

The yaw bridge 122 has left and right holes, in the same manner as the IS main body 109 and pitch holding frame 120, through which the yawing holding frames 108L and 108R pass.

When the yawing holding frames 108L and 108R pivot about the yawing pivot fulcrums 105L and 105R, the yaw bridge 122 can move only in a direction substantially perpendicular to the optical axes of the rear groups 101LB and 101RB. The yaw bridge 122 forms a so-called parallel link mechanism together with the yawing holding frames 108L and 108R and pitch holding frame 120. Hence, the optical axes of the rear groups 101LB and 101RB are always maintained to be parallel to each other.

A driving coil 127c for forming a yawing-direction driving mechanism 127 is fixed at substantially the center of the yaw bridge 122.

Reference numeral 128 denotes an IS locking member which temporarily fixes the yaw bridge 122 to a predetermined position. When the yaw bridge 122 is fixed to the predetermined position with the IS locking member 128, the optical axes of the rear groups 101LB and 101RB can be set to coincide with the optical axes of the front groups 101LA and 101RA.

Reference numeral 130 denotes an IS lock switch. When the observer wants to use the binocular, he or she operates the IS lock switch 130 to press a projection 128a formed on the IS locking member 128, thereby releasing the yaw bridge 122. More specifically, the rear groups 101LB and 101RB held by the yawing holding frames 108L and 108r become pivotal in the yawing direction and pitching direction.

Reference numeral 123 denotes a yoke support member for supporting a permanent magnet 127a and yoke 127b that constitute the yawing-direction driving mechanism 127. The yoke support member 123 is fixed to the IS main body 109 with machine screws or the like.

Reference numeral 124 denotes the pitching-direction detector for detecting the pivot position (angle) of the pitch holding frame 120. The pitching-direction detector 124 is comprised of the permanent magnet 124a and Hall element 124b.

Reference numeral 125 denotes the pitching-direction driving mechanism for rotatably driving the pitch holding frame 120 about the pitching pivot fulcrum 104. The pitching-direction driving mechanism 125 is comprised of the permanent magnet 125a, yoke 125b, and coil 125c. In this embodiment, the coil 125c and coil support member 121 are provided to that side of the pitching pivot fulcrum 104 which is opposite to the rear groups 101LB and 101RB, so they keep weight balance with the rear groups 101LB and 101RB.

Reference numeral 127 denotes the yawing-direction driving mechanism for driving the yaw bridge 122. The yawing-direction driving mechanism 127 is comprised of the permanent magnet 127a, yoke 127b, and driving coil 127c.

An electrical arrangement that controls the shaking correction unit described above will be described. This shaking correction unit has a shaking detector and a drive control circuit. The shaking detector detects the shaking amount of the binocular during observation. The drive control circuit drive-controls the rear groups 101LB and 101RB, serving as the shaking correction optical system, on the basis of an output signal from the shaking detector, to suppress movement of a focal image formed by the objective lenses, thereby decreasing shaking of the observation image. The shaking detector is comprised of a pitching-direction shaking sensor for detecting shaking in the pitching direction, and a yawing-direction shaking sensor for detecting shaking in the yawing direction.

Reference numeral 129 denotes the drive control board which has the shaking detector and other control circuit and drive circuit. The control circuit mounted on the drive control board 129 drive-controls the pitching-direction driving mechanism 125 and yawing-direction driving mechanism 127, on the basis of the detection signal from the shaking detector, in directions to cancel image shaking caused by shaking of the binocular.

When the user of the binocular wants to use the shaking correction function, he presses the IS lock switch 130. Then, the projection 128a formed on the IS locking member 128 is pressed, and a switch (not shown) for outputting electrical ON and OFF signals is actuated. When the observer further presses the IS lock switch 130, the IS locking member 128 releases the yaw bridge 122. More specifically, the yawing holding frames 108L and 108R become pivotal in the pitching direction and yawing direction, and the rear groups 101LB and 101RB become pivotal in the pitching direction and yawing direction.

At this time, when the binocular shakes because the observer's hand shakes, the drive control board 129 applies a control voltage to the coil 125c or 127c, which constitutes the pitching-direction driving mechanism 125 or yawing-direction driving mechanism 127, on the basis of the detection signal from the shaking detector. The control voltage to be applied to the coil 125c or 127c is determined as a voltage necessary for pivoting the rear group 101LB or 101RB through predetermined angles in such directions that can cancel image shaking caused by shaking of the binocular.

Accordingly, a driving force (exciting force) based on the Fleming's rule is generated in the coil 125c or 125c, and the pitch holding frame 120 or yaw bridge 122 for holding the coil 125c or coil 127c moves in the yawing direction or pitching direction. In this manner, the rear groups 101LB and 101RB held by the yawing holding frames 108L and 108R pivot in the yawing direction and pitching direction, so the observer can observe left and right images free from shaking.

As shown in FIG. 8, the yaw bridge 122 has a locking portion at its close-to-right center to lock the IS locking member 128. When the IS locking member 128 is locked by this locking portion, movement of the yaw bridge 122 can be prohibited. Namely, when the observer does not need image shaking correction, he does not press the IS lock switch 130, so image shaking correction will not be performed.

In this manner, an optical system and a mechanism that corrects shaking of the observation image regardless of shaking of the observer's hands are mounted in the binocular of this embodiment. Since the shaking-proof mechanism described above is mounted in the binocular of this embodiment, it is not easy to finely alter and adjust the pair of optical axes 03L and 03R of the objective lenses 101L and 101R to desired positions. More specifically, to align the optical axes so the left and right observation images of the binocular coincide with each other, the objective lenses 101L and 101R described above must be finely moved such that the front and rear groups form a pair.

The objective lenses 101L and 101R are comprised of the front groups 101LA and 101RA and rear groups 101LB and 101RB. Since the respective lens groups are held by different mechanisms, it is very difficult to finely move them by the same amount in the same direction simultaneously.

This situation is simply dealt with in the following manner. For example, regarding the front groups 101LA and 101RA of the objective lenses 101L and 101R, since the pair of left and right objective fixing cylinders 107L and 107R which support the front groups 101LA and 101RA are fixed to the IS main body 109 with the machine screws or the like, their optical axes can be moved for adjustment comparatively easily. However, the relationship between the front and rear groups that form each objective lens changes due to adjustment and movement, and the optical performance of each objective lens itself is degraded. Alternatively, when the rear groups 101LB and 101RB of the objective lenses 101L and 101R are to be moved for adjustment, the optical performance is decreased in the same manner as with the front groups described above. In addition, the adjusting mechanism becomes complicated.

In view of this, according to this embodiment, alignment of the left and right optical axes of the observation images is not performed by the objective lens portions. Rather, an optical axis adjusting mechanism which finely inclines one of the eyepiece units 112L and 112R with respect to the other is employed, in the same manner as in the first embodiment described with reference to FIGS. 3B, 4, 5A through 5B, and 6A through 6C. The left and right optical axes can be adjusted easily without decreasing the optical performance of the objective lenses. The adjusting mechanism of the second embodiment is the same as that of the first embodiment, and a detailed description thereof will be omitted.

(Third Embodiment)

Figure 9:
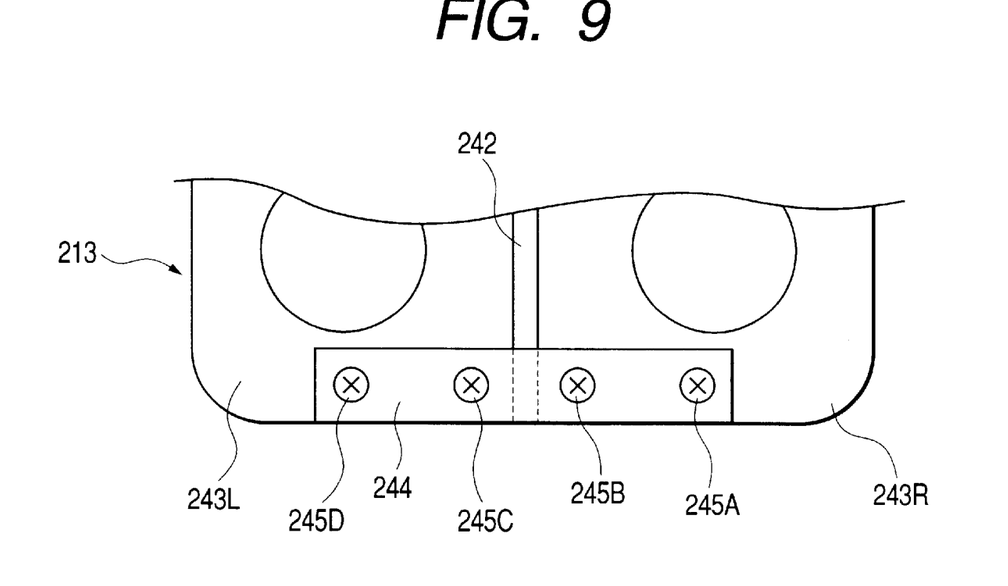
FIG. 9 is a rear view of an adjusting mechanism in a binocular of the third embodiment.
Figure 10:
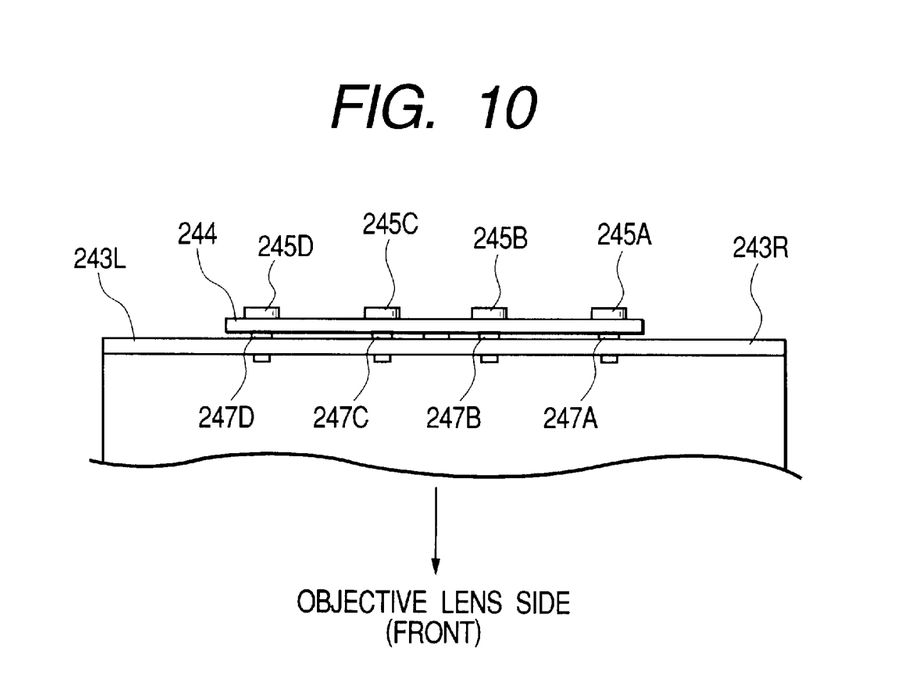
FIG. 10 is a bottom view of the adjustment mechanism of the third embodiment.

FIGS. 9 and 10 show the arrangement of an optical axis adjusting mechanism in a binocular according to the third embodiment of the present invention.

In this embodiment, in place of the optical axis adjusting mechanism employed in the binoculars of the first and second embodiments, a base (holding member) 10 made of a metal plate, which does not have bent portions 43L and 43R formed at the lower ends of its holding portions 13L and 13R perpendicular to the optical axis of the base 10, is employed. In this embodiment, only an optical axis adjusting mechanism different from those of the first and second embodiments will be described.

FIG. 9 is a view, seen from the rear side (eyepiece unit side), of the main part including holding portions 243L and 243R, which correspond to the holding portions 13L and 13R perpendicular to the optical axis of the base 10 of the first embodiment. FIG. 10 corresponds to FIG. 9 and is a view of the optical axis adjusting mechanism seen from below.

A groove 242 is formed between the holding portions 243L and 243R to run from the lower end at the center to an upper predetermined position. Eyepiece units (not shown) are respectively attached to the holding portions 243L and 243R.

As shown in FIGS. 9 and 10, an adjusting plate 244 is fixed to the holding portions 243L and 243R with four machine screws, i.e., adjusting machine screws 245A and 245B and fixing machine screws 245C and 245D.

When attaching the adjusting plate 244 to the holding portions 243L and 245R with these four machine screws, four spacers, i.e., adjusting spacers 247A and 247B and reference spacers 247C and 247D, are clamped between the holding portions 243L and 243R and the adjusting plate 244 in advance, to create an adjustment reference state.

A method of adjusting the right and left optical axes in the above arrangement will be described. This embodiment will be made with the left holding portion 243L being the reference state during adjustment. Alternatively, the right holding portion 243R may be the reference state during adjustment if no problem occurs particularly.

After assembly of the binocular, if the right and left optical axes are in the initial adjustment state and coincide with each other, the adjusting spacers 247A and 247B need not be altered but can be left as they are. If displacement in the up-to-down direction exists between the right and left optical axes, the adjusting spacers 247A and 247B may be increased or decreased simultaneously when necessary, so vertical optical axis adjustment can be performed.

More specifically, when the thicknesses of the adjusting spacers 247A and 247B are decreased or they are eliminated altogether, the right holding portion 243R is pulled backward as it moves toward the adjusting plate 244, so it finely moves to be relatively away from the objective lens side than the left holding portion 243L is.

Thus, the observation side of the right eyepiece unit (not shown) held by the right holding portion 243R moves upward with respect to the left eyepiece unit (not shown), so the right observation system observes downward conversely to the left observation system.

When the thicknesses of the adjusting spacers 247A and 247B are increased to be larger than the reference, the right holding portion 243R is pushed forward away from the adjusting plate 244, and finely moves to be relatively close to the objective lens side than the left holding portion 243L is.

Hence, the observation side of the right eyepiece unit (not shown) held by the right holding portion 243R moves downward with respect to the left eyepiece unit (not shown), so the right observation system observes upward conversely to the left observation system. In this manner, optical axis adjustment in the up-to-down direction of the pair of eyepiece units (not shown) can be realized by increasing or decreasing the thicknesses of the adjusting spacers 247A and 247B simultaneously.

An adjusting method for a case wherein displacement in the left-to-right direction is present between the right and left optical axes of the pair of eyepiece units (not shown) will be described. Assume that the thickness of the adjusting spacer 247A is increased while that of the adjusting spacer 247B is decreased. The outer side of the right holding portion 243R is pushed forward away from the adjusting plate 244, while the inner side of the right holding portion 243R is pulled close to the adjusting plate 244.

Hence, the right holding portion 243R finely rotates to the right (clockwise) in FIG. 10, and the observation side of the right eyepiece unit (not shown) held by the holding portion 243R moves outward with respect to the left eyepiece unit (not shown). Thus, the right observation system observes inwardly conversely to the left observation system.

When the thickness of the adjusting spacer 247A is decreased while that of the adjusting spacer 247B is increased, the right observation system observes outwardly conversely to the left observation system. In this manner, optical axis adjustment in the right-left-direction of the pair of eyepiece units (not shown) can be realized by changing the thicknesses of the adjusting spacers 247A and 247B simultaneously in a conversed manner.

When an adjusting mechanism which finely inclines one of the pair of right and left eyepiece units relative to the other as a reference eyepiece unit is formed as in the first or third embodiment, adjustment of the right and left optical axes of the binocular can be consequently realized.

As shown in the third embodiment, if the two positions of the right holding portion 243R, i.e., the outer side (corresponding to the adjusting spacer 247A) and the inner side (corresponding to the adjusting spacer 247B) can be moved forward and backward independently of each other, other methods that do not use the adjusting spacers 247A and 247B may be possible. For example, if an adjusting mechanism comprised of a "push-pull screw" is used in this portion, optical axis adjustment in the up-to-down and left-to-right directions that can be done by finely inclining one eyepiece unit with respect to the other eyepiece unit can be performed easily.

Furthermore, in the first and second embodiments, adjustment can be performed from a direction perpendicular to the optical axes of the objective lenses, and adjustment described in the third embodiment can also be performed from the eyepiece unit side. In either case, adjustment can be performed at a location sufficiently away from the optical axes of the eyepieces. Therefore, adjustment can be performed more easily than in the conventional case.

The adjusting mechanism of each of the respective embodiments described above can be applied to binoculars other than that described above, particularly to a binocular in which all or some of the groups of a pair of right and left objective optical systems are integrally held, or in which all or some of the groups of the objective optical systems are held to be interlocked to each other without changing the distance between them when the binocular is in use.

As has been described above, in the embodiments described above, one eyepiece unit can be inclined and moved with respect to the other eyepiece unit for the purpose of optical axis adjustment. Therefore, the right and left optical axes can be adjusted easily without causing a problem in the position of a mechanism that provides an additional function to the objective optical system, or without impairing the eye-to-eye width adjusting mechanism.

What is claimed is:

1. A binocular comprising:

a pair of objective optical systems;

a pair of eyepiece units for integrally holding erecting optical systems and eyepiece optical systems; and a holding member having a first holding portion for holding one of said pair of eyepiece units and a second holding portion for holding the other one of said pair of eyepiece units, wherein said holding member is deformed such that said pair of eyepiece units have a predetermined positional relationship.

2. The binocular according to claim 1, wherein said holding member is made of a metal plate.

3. The binocular according to claim 1, further comprising:

bent portions respectively formed on the first and second holding portions of said holding member;

a connecting member for connecting the bent portions; and an eccentric mechanism for setting held positions of said connecting member and the bent portions to be eccentric, said eccentric mechanism including an eccentric roller, wherein when the eccentric roller is rotated, the held positions of said connecting member and the bent portions become eccentric, so said holding member deforms such that an optical axis of said eyepiece unit held by the first holding portion and an optical axis of said eyepiece unit held by the second holding portion are set in a predetermined state.

4. The binocular according to claim 3, wherein the first holding portion is fixed to said connecting member with a screw, and the second holding portion is held by said connecting member such that the held position thereof can be set eccentric by the eccentric roller.

5. The binocular according to claim 1, further comprising a pair of correction optical systems arranged between said pair of objective optical systems and the erecting optical systems, said pair of correction optical systems serving to correct shaking of an image caused by shaking of the binocular.

6. The binocular according to claim 1, further comprising a pair of correction optical systems including part of said pair of objective optical systems, said pair of correction optical systems serving to correct shaking of an image caused by shaking of the binocular.

7. A binocular comprising:

a pair of objective optical systems;

a pair of eyepiece units for integrally holding erecting optical systems and eyepiece optical systems; and a holding member having a first holding portion for holding one of said pair of eyepiece units and a second holding portion for holding the other one of said pair of eyepiece units, wherein said holding member can be deformed such that said pair of eyepiece units have a predetermined positional relationship.

8. The binocular according to claim 7, wherein said holding member is made of a metal plate.

9. A method of manufacturing a binocular, comprising the steps of:

holding one of a pair of optical units with a first holding portion of a holding member, and holding the other one of the pair of optical units with a second holding portion of the holding member; and deforming the holding member, thereby adjusting a positional relationship between the optical units.

10. The method according to claim 9, wherein the pair of optical units are eyepiece units that integrally hold erecting optical systems and eyepiece optical systems.

11. A method of manufacturing a binocular, comprising the steps of:

holding one of a pair of optical units with a first holding portion of a holding member, and holding the other one of the pair of optical units with a second holding portion of the holding member;

connecting a bent portion of the first holding portion and a bent portion of the second holding portion through a connecting member;

setting a connecting position of the connecting member and the bent portion of the first holding portion to be eccentric by rotating an eccentric roller, so the holding member deforms, thereby adjusting a positional relationship between the optical units.

12. The method according to claim 11, wherein the pair of optical units are eyepiece units that integrally hold erecting optical systems and eyepiece optical systems.

* * * * *